United States Patent [19]

Schroeder

[11] 4,405,190

[45] Sep. 20, 1983

[54] CIRCUIT INTERCHANGE MODULE

[76] Inventor: John H. Schroeder, 1030 Jefferson St., Anoka, Minn. 55303

[21] Appl. No.: 262,444

[22] Filed: May 11, 1981

[51] Int. Cl.[3] ............................................ H01R 29/00
[52] U.S. Cl. ............................. 339/28; 307/10 LS; 339/10; 339/32 R
[58] Field of Search ................... 339/10, 18, 28, 32 R, 339/33, 49 R, 154–159; 307/10 R, 10 LS; 361/352; 280/422

[56] References Cited

U.S. PATENT DOCUMENTS

| | | | |
|---|---|---|---|
| 774,611 | 11/1904 | Sprague | 307/9 |
| 2,070,832 | 2/1937 | Johnson | 180/79.1 |
| 2,581,994 | 1/1952 | Winterhalter | 339/49 R |
| 2,660,679 | 11/1953 | Hunt | 307/10 |
| 2,797,337 | 6/1957 | Hollins | 307/10 |
| 2,975,297 | 3/1961 | O'Neil | 307/10 |
| 2,989,645 | 6/1961 | Frieden | 307/10 |
| 2,994,001 | 7/1961 | Moorhead, Jr. | 307/10 |
| 3,004,170 | 10/1961 | Greenspan | 307/10 |
| 3,417,213 | 12/1968 | Bryant | 200/51 |
| 3,466,453 | 9/1969 | Greenberg | 307/10 |
| 3,494,657 | 2/1970 | Tantlinger et al. | 269/28 |
| 3,497,707 | 2/1970 | Stewart | 307/9 |
| 3,915,476 | 10/1975 | Burkle | 280/422 |
| 3,957,333 | 5/1976 | Kaminski | 361/245 |
| 4,005,313 | 1/1977 | Tibbits | 307/10 |
| 4,057,310 | 11/1977 | Young | 339/10 |

*Primary Examiner*—Neil Abrams
*Attorney, Agent, or Firm*—Burd, Bartz & Gutenkauf

[57] ABSTRACT

A circuit interchange for interconnecting towing and towed components of an articulated land vehicle, including a socket having an array of male and female connector elements so positioned and interconnected that by proper orientation of a trailer plug in the socket the trailer lights can be properly coordinated with the towing vehicle lights regardless of the wiring systems to the plug and socket. The interchange may be modular or in jumper form, or may be in part permanently substituted for the socket of the towing vehicle.

6 Claims, 8 Drawing Figures

4,405,190

CIRCUIT INTERCHANGE MODULE

TECHNICAL FIELD

This invention relates to the field of transportation, and particularly to apparatus for electrically interconnecting the towing and towed components of an articulated land vehicle, such as a car and a house; horse; or boat-trailer drawn thereby.

BACKGROUND OF THE INVENTION

All automotive vehicles are now equipped with electric lights at their rear ends, including left turn and right turn lights and a tail light which also functions as a stop light. When it is desired to draw a trailer behind a vehicle, the trailer masks the signal lights of the towing vehicle, and so the lights must be duplicated at the rear of the trailer, and electrical connections must be made to the lighting circuits of the car, to operate the trailer lights, as well.

Standard male and female multi-conductor connectors have been developed for this purpose. There has, however, been no standard system agreed on for connecting the conductors of a car or those of a trailer to particular contacts in the standard connectors. Accordingly, the owner of a car having an electrical socket for connection to a first trailer cannot count on being able to connect that socket to the plug of some other trailer.

SUMMARY OF THE INVENTION

The present invention comprises a circuit interchange by means of which the plug of any trailer may be connected to the socket of any car. This is accomplished by arranging male and female connector elements in a matrix of mutually orthogonal rows, and interconnecting the elements so that effective order is different in different rows.

Various advantages and features of novelty which characterize the invention are pointed out with particularity in the claims annexed hereto and forming a part hereof. However, for a better understanding of the invention, its advantages, and objects obtained by its use, reference should be had to the drawing which forms a further part hereof, and to the accompanying descriptive matter, in which there are illustrated and described certain preferred embodiments of the invention.

BRIEF DESCRIPTION OF THE DRAWINGS

In the drawing, in which like reference numerals indicate corresponding parts throughout the several views.

DESCRIPTION OF THE PREFERRED EMBODIMENTS

Figure 1:
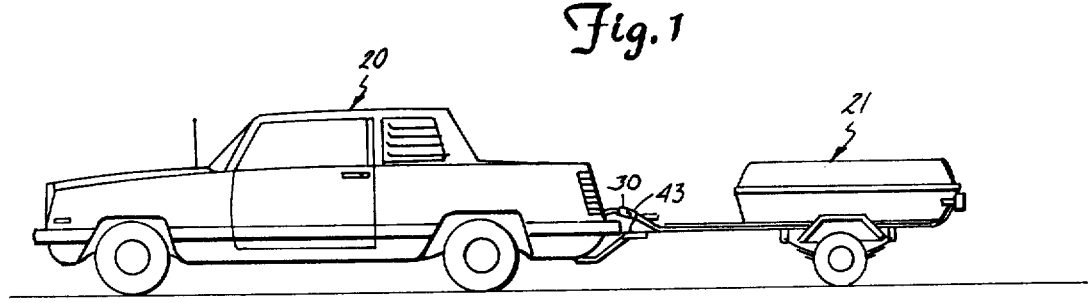
FIG. 1 is a perspective view of an articulated land vehicle where the invention is to be used.

FIG. 1 shows an articulated land vehicle to comprise a towing vehicle 20 and a towed vehicle 21. While a private car is shown towing a utility trailer in this Figure, it will be realized that other towing vehicles, such as vans or trucks, can be used with the invention, while drawing other towed vehicles, such as house-trailers, boat-trailers, or horse-trailers.

Figure 2:
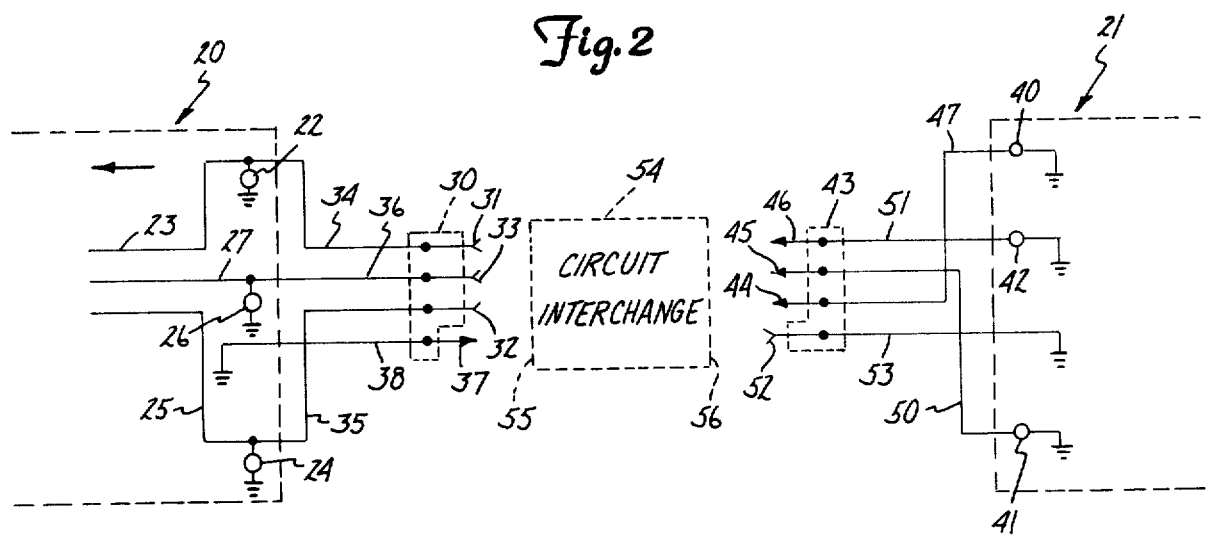
FIG. 2 gives the details of the circuitry for a towing vehicle and a towed vehicle, to illustrate the problems solved by the invention.

FIG. 2 shows the towing vehicle 20 including a right turn light 22 energized through a conductor 23, a left turn light 24 energized through a conductor 25, and a tail and stop light 26 energized through a conductor 27. The circuits to these lights are completed in the towing vehicle by ground connections, one terminal of the car battery being conventionally grounded.

Towing vehicle 20 is shown with a standard trailer connection socket 30 having female connector elements 31, 32, and 33, connected by conductors 34, 35, and 36, respectively, to conductors 23, 25, and 27, and a male connector element 37 grounded by a conductor 38.

Towed vehicle 21 is shown to have a right turn light 40, a left turn light 41, and a tail and stop light 42, having first terminals grounded. A standard trailer connection plug 43 is shown to have male connector elements 44, 45, and 46 connected by conductors 47, 50, and 51 with lights 40, 41, and 42, respectively, and a female connector element 52 grounded by a conductor 53.

The connector elements of plug 43 are physically arranged to inter-engage with the connector elements of socket 30. It will be evident, however, that if this is done directly the trailer lights will not be properly coordinated with the lights of the towing vehicle, right turn light 40 of the towed vehicle being energized at the same time as left turn light 24 of the towed vehicle, for example. The ground connection will be properly made, because this is a standard connection throughout the industry. A circuit interchange 54, according to the invention, is provided to enable proper correlation between the lights of the vehicles, and includes a plug end 55 to engage vehicle socket 30 and a socket end 56 to receive trailer plug 43.

Figure 4:
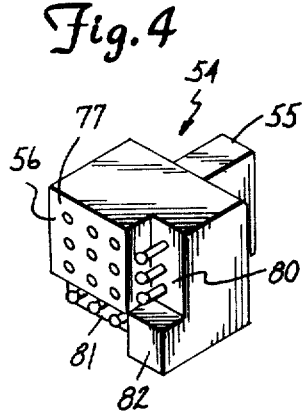
FIGS. 3, 4, and 5 give details of a first embodiment of a circuit interchange according to the invention.
Figure 3:
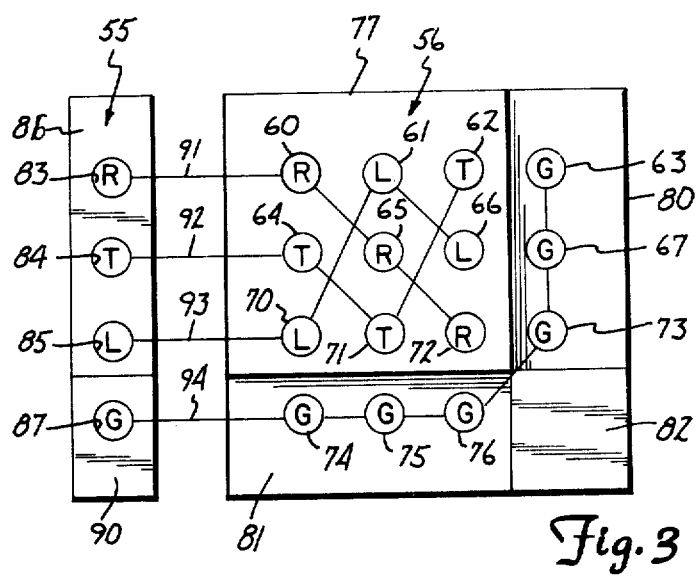
Figure 5:
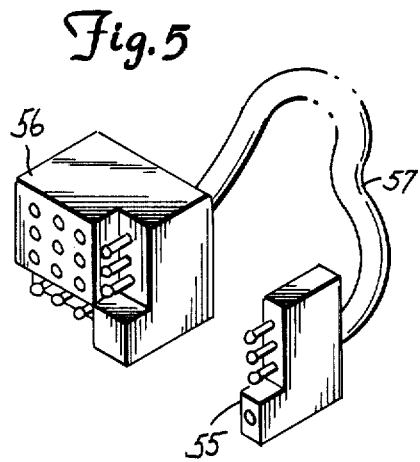

FIG. 4 shows that interchange 54 may be constructed in modular form, plug end 55 and socket end 56 being integrated or encapsulated into a unitary structure. FIG. 5 shows that the plug and socket ends of interchange 54 may be physically separate, the connector elements being interconnected by a cable 57. In either case, socket end 56 comprises a body of insulating material in which are disposed a matrix of male and female connection elements arranged in orthogonal rows comprising three female elements and one male element each. FIG. 3 shows a top row to include female elements 60, 61, 62 and male element 63, a second row to include female elements 64, 65, 66 and male element 67, a third row to include female elements 70, 71, and 72 and male element 73, and a fourth row to include male elements 74, 75, and 76. Considered as vertical rows, a left hand row comprises female elements 60, 64, 70 and male element 74, a second row comprises female elements 61, 65, 71 and male element 75, a third row comprises female elements 62, 66, 72 and male element 76, and a right hand row comprises male elements 63, 67, and 73. The spacings between the connector elements in the vertical and horizontal rows is in accord with the spacing of the contacts of standard socket 30. The physical dimensions of socket end 56 are also in accord with the structure of a standard plug 43, female elements 60, 61, 62, 64, 65, 66, 70, 71, and 72 being on a raised boss 77 and male connector elements 63, 67, 73, and 74, 75, and 76 being on ledges 80 and 81 below boss 77. A pedestal 82 at the same level as boss 77 prevents the attempted mating of a plug with the bottom row or the right hand row of connector elements.

As a part of socket end 56, female connector elements 60, 65, and 72 are inter-connected, as are connector elements 64, 71, and 62 and connector elements 70, 61, and 66. Male elements 63, 67, 73, 76, 75, and 74 are all interconnected.

Plug portion 55 comprises a single row of connector elements, male elements 83, 84, and 85 being at a principal level 86 and female element 87 being at a raised level 90. Conductors 91, 92, 93, and 94 interconnect female connector elements 83 and 60, 84 and 64, 85 and 70, and male connector elements 87 and 74. These conductors may be integral in the embodiment of the invention shown in FIG. 6. In the embodiment of FIG. 5 these conductors comprise cable 57.

If plug portion 55 is connected to towing vehicle socket 30, female connector elements 60, 65, and 72 will be connected to right turn light 22, female connector elements 64, 71, and 62 will be connected to tail light 26, female connector elements 70, 61, and 66 will be connected to left turn light 24, and elements 74, 75, 76, 73, 67, and 63 will be grounded. Using the letters R, T, L, and G to stand for the right turn, tail, left turn, and ground circuits, and reading the rows toward the ground connectors in each case, every possible permutation of the three circuits can be found, the horizontal rows from top to bottom reading RLTG, TRLG, and LTRG, and the vertical rows from left to right reading RTLG, LRTG, and TLRG.

Inspection of FIG. 2 shows that trailer plug 43 reads TLRG. To properly connect the trailer lights to the towing vehicle lights through the interchange, it is therefore only necessary to insert plug 43 into socket 56 in the right hand vertical row of contacts. Other trailer plugs having different wiring arrangements can readily be accepted by using the proper horizontal or vertical row of contacts in socket end 56. It is perfectly safe to do this by a trial and error method, plug 43 being inserted into socket end 56 in various positions at random and shifted from one to another until the trailer lights agree with those of the towing vehicle in every respect.

Figure 6:
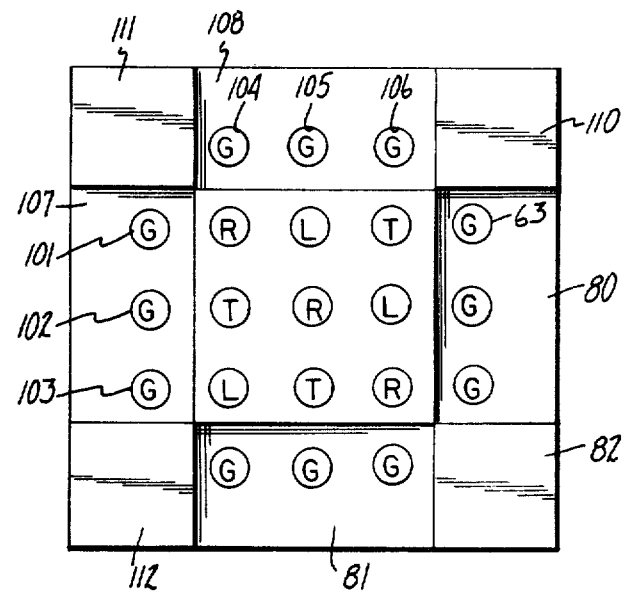
FIG. 6 is a view like FIG. 3 showing a second embodiment of the invention.

Attention is now directed to FIG. 6, which shows a modified embodiment of the socket end of interchange 54. This contains the nine female connector elements on the common boss, as before, and the associated six male connector elements at first ends of the rows on ledges 80 and 81. However, in this embodiment, six further male connector elements 101-106 are provided, at the ends of the rows opposite to the first male connector elements, further ledges 107 and 108 and further pedestals 110, 111, and 112 being provided.

This arrangement gives a measure of redundancy to the interchange, as each sequence is now available in two different positions of plug 43. The plug can be inserted into any row in either of two opposite orientations, giving double the number of plug positions, and hence doubling the occurrence of each combination. Thus, RLTG is available either at the top horizontal row using ground contact 63, or at the right hand vertical row using ground contact 106. Mechanical failure or damage to any one contact element does not require replacement of the entire interchange under these circumstances.

It will be evident that availability of an interchange according to the invention enables the proper connection of any trailer plug to any vehicle socket.

Figure 7:
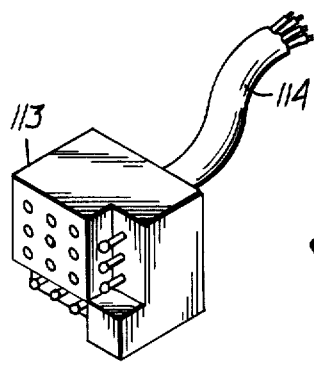
FIG. 7 shows how a portion of the interchange may be made a permanent part of a towing vehicle.

FIG. 7 shows that if desired a socket portion 113 of the interchange may be substituted for the usual vehicle socket, and connected to the vehicle wiring through a cable 114, thus, avoiding the need for a separate complete interchange.

Figure 8:
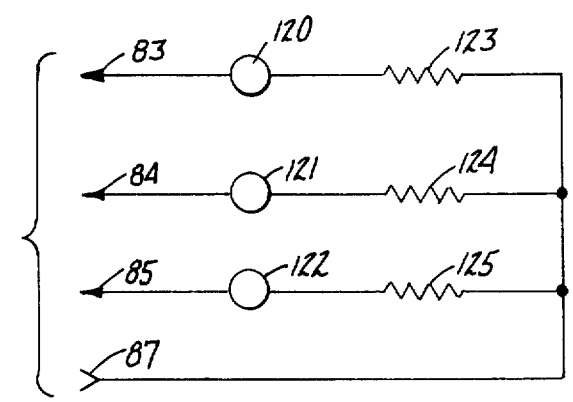
FIG. 8 shows a convenient accessory.

As an added convenience it is possible to modify plug 55 of FIG. 5, as shown in FIG. 8, by encapsulating therein three light emitting diodes 120, 121, and 122 and three resistors 123, 124, and 125. Each diode is connected in series with a resistor, the resistors are all connected to female connector element 87, and the diodes are connected to male connector elements 83, 84, and 85, respectively. Any defect in the vehicle wiring to socket 30 can be detected by lack of operation of a light emitting diode. As a further convenience the boss 77, shown in FIG. 3, can be provided with embossed numbers 1 to 6 opposite the six rows of female elements. The numbers provide the user with plug position references.

From the foregoing it will be evident that the invention comprises a circuit interchange for use in connecting the lights of a towing vehicle to those of a towed vehicle, so that a functionally correct interconnection can be made regardless of the particular wiring arrangement of the vehicles, plugs, and sockets.

Numerous advantages and characteristics of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

The embodiments of the invention in which an exclusive property or privilege is claimed are defined as follows:

1. An electrical circuit interchange for use with a land vehicle assembly having a towing vehicle and a towed vehicle, comprising: a socket member including a plurality of female connector elements arranged in equal orthogonally disposed rows; a male connector element disposed at the end of each of said rows; means electrically interconnecting said male connector element to form a first circuit; means electrically interconnecting selected female elements in said rows to form second, third, and fourth circuits such that the order of the circuits in each row, reading toward the male connector element, is different from that in every other row, said circuits in said rows being arranged to provide alternative manners of joining electrical devices on said towing and towed vehicles by joining a mating connector to a selected one of said rows.

2. An interchange according to claim 1 further comprising: male contact elements disposed at both ends of each of said rows, so that said order of said circuits in any row can have two different values depending on which male element is read towards.

3. An interchange according to claim 1 further comprising: a plug member having a plurality of further male connector elements and a further female connector element arranged in a row, means connecting said further male elements to said second, third, and fourth circuits of said socket ends, and means connecting said further female element to all said male circuit elements of said socket member.

4. An interchange according to claim 3 in which: said plug member and said socket member are separate units interconnected by a multi-conductor cable.

5. An interchange according to claim 3 in which: said plug member and said socket member are portions of a unitary module.

6. An interchange according to claim 1, together with a multi-conductor cable having conductors connected to said first, second, third, and fourth circuits.

* * * * *